3,444,249
2,2-DICHLORO - 1,1,3,3 - TETRAFLUOROPROPANE AND METHOD OF PREPARING SAME
Bernard M. Regan, Chicago, Ill., assignor to Baxter Laboratories, Inc., Morton Grove, Ill., a corporation of Delaware
No Drawing. Original application Mar. 23, 1966, Ser. No. 538,453, now Patent No. 3,332,840, dated July 25, 1967. Divided and this application Feb. 28, 1967, Ser. No. 619,211
Int. Cl. C07c 19/08; A61k 13/00
U.S. Cl. 260—653     2 Claims

ABSTRACT OF THE DISCLOSURE

The compound 2,2-dichloro-1,1,3,3-tetrafluoropropane, useful as an inhalation anesthetic, and the methods of preparing said compound by (a) exothermic reaction of phosphorous pentachloride and 1,1,3,3-tetrafluoroacetone followed by heating to about 170° C. and by (b) photo-induced chlorination of 2-chloro-1,1,3,3-tetrafluoropropane at about 20° C. to about 70° C.

---

This is a division of application Ser. No. 538,453, filed Mar. 23, 1966, now U.S. Patent No. 3,332,840 issued July 25, 1967.

This invention relates to a novel polyhalotetrafluoropropane. More particularly, this invention relates to a dichlorotetrafluoropropane having two chlorine atoms substituted on the number two carbon atom, namely 2,2-dichloro-1,1,3,3-tetrafluoropropane.

It is known that certain halogenated alkanes are useful inhalation anesthetics. Chloroform and halothane are well-known examples of such compounds which are halogen derivatives of the lower alkanes, methane and ethane, respectively. More recently, it has also been found that certain halogenated propanes are useful inhalation anesthetics. Thus, Dutton et al., British Patent 1,004,606, discloses the inhalation anesthetic use of 3,3-dichloro-1,1,2,2-tetrafluoropropane which is a position isomer of the dichlorotetrafluoropropane of this invention.

Other position isomers of the compound of this invention also are known. Thus, Hauptschein et al., 73 J. Am. Chem. Soc'y 1428–30 (1951) discloses 1,2-dichloro-1,2,3,3-tetrafluoropropane; McBee et al., 62 J. Am. Chem. Soc'y. 3340–1 (1940), and Henne et al., 65 J. Am. Chem. Soc'y 2362–3 (1943) disclose 1,3-dichloro-1,1,2,2-tetrafluoropropane. However, the latter two compounds are not known as clinically useful inhalation anesthetics. Certain other related halogenated tetrafluoropropanes, e.g., 1,2,2,3-tetrachloro-1,1,3,3-tetrafluoropropane, are known to be non-anesthetic and convulsant.

It has now been found that the novel 2,2-dichloro-1,1,3,3-tetrafluoropropane of this invention is a useful non-flammable inhalation anesthetic in mice and rabbits, which is less hepatotoxic in mice than 2-bromo-2-chloro-1,1,1-trifluoroctane which is a halogenated fluoroalkane in current use as an inhalation anesthetic. Moreover, the novel compound of this invention is soda lime stable as distinguised from the isomeric 3,3-dichloro-1,1,2,2-tetrafluoropropane of Dutton et al., which is not soda lime stable. The compound of this invention also has a good inhallation margin of safety, being better than the margin of safety for ether, chloroform, and halothane. As such, the compound of this invention holds good promise as an effective and useful agent for inducing anesthesia in man.

The novel dichlorotetrafluoropropane defined herein can be employed as an inhalation anesthetic agent by utilizing apparatus or machines designed for the vaporization of liquid anesthetics and the admixture thereof with oxygen, air, or other gaseous mixtures containing oxygen in amounts capable of supporting respiration.

The novel anesthetic should be free from toxic impurities which may be present according to the particular method of preparation. It may be admixed with other pharmaceutically acceptable materials such as stabilizers, e.g., thymol, or one or more known inhalation anesthetics, e.g., nitrous oxide, ether, chloroform, 2-bromo-2-chloro-1,1,1-trifluoroethane cyclopropane and 2,2-dichloro-1,1-difluoroethyl methyl ether.

The 2,2-dichloro-1,1,3,3-tetrafluoropropane boils at 74° C. and can be conveniently stored in containers normaly used for conventional anesthetics of comparable boiling point, e.g., ether, chloroform and halothane.

The novel dichlorotetrafluoropropane of the present invention can be conveniently prepared from phosphorous pentachloride and 1,1,3,3-tetrafluoroacetone by exothermic reaction with or without a suitable diluent followed by heating to about 170° C. and then separating the desired product from the reaction mixture.

Generally, from about one to about two moles of the phosphorous pentachloride are used per mole of the tetrafluoroacetone in the above reaction.

Examples of suitable diluents for use in the above reaction are 1,2-dichlorobenzene and 1,2,4-trichlorobenzene.

Upon completion of the reaction, the desired 2,2-dichloro-1,1,3,3-tetrafluoropropane can be purified by hydrolysis with water followed by fractional distillation.

Another convenient method of preparing the novel dichlorotetrafluoropropane defined herein comprises the photoinduced chlorination of 2-chloro-1,1,3,3-tetrafluoropropane with about 0.5 to about 1.0 molar equivalent of chlorine, preferably at about 20° C.–70° C., followed by separating the 2,2 - dichloro-1,1,3,3-tetrafluoropropane from the reaction mixture.

Although the above methods of preparation and reaction conditions are specifically described, it will be understood that the novel compound of this invention is not limited to these specific reaction conditions or to these specific methods of preparation.

The following examples will further illustrate the present invention although the invention is not limited to these specific examples.

EXAMPLE I 2,2-dichloro-1,1,3,3-tetrafluoropropane (I)

1,1,3,3-tetrafluoroacetone (879 gm., 6.75 moles, B.$_{745}$ 57.6–58.1° C.) was added during three hours to a stirred mixture of phosphorous pentachloride (1500 gm., 7.2 moles) and 3000 ml. of 1,2-dichlorobenzene at 27°–52° C. After continued stirring for 20 hours, the reaction mixture was heated to 80° C. when a vigorous evolution began carrying product (83 gm.) through a cold-water condenser and into a Dry-Ice trap. When the evolution ceased, the reaction mixture was cooled slightly and fitted with a Vigreux distilling column and downward spiral cold-water condenser. Then the reaction mixture was heated to 170° C. until no more product (495 gm.) collected in the receiver. The distilled products were combined and stirred with 300 ml. of water for three hours at autogenous temperature. The hydrolyzed product was separated, neutralized with a dilute aqueous sodium hydroxide wash and dried by azeotropic distillation to give 418 gm. of volatile products. Fractional distillation gave 243 gm. (19% of the theoretical yield) of I, B.$_{750}$ 72.3–74.7° C., of about 98% purity by gas liquid chromatography (G.L.C.). Pure (99.99% by G.L.C.) I has B.$_{760}$ 74° C., $d_4^{20}$ 1.5718, $n_D^{20}$ 1.3577 and an estimated vapor pressure of 86 mm. Hg at 20° C. Its NMR, infrared and mass spectra confirm the $CHF_2$—$CCl_2$—$CHF_2$ structure.

*Analysis.*—Calculated for $C_3H_2Cl_2F_4$: C, 19.46%; H, 1.09%; Cl, 38.34%. Found: C, 19.70%; H, 1.16%; Cl, 38.54%.

EXAMPLE II

2,2-dichloro-1,1,3,3-tetrafluoropropane (I)

Chlorine gas (0.6 molar eq.) was bubbled into 2-chloro-1,1,3,3-tetrafluoropropane (1.0 molar eq.) illuminated through Pyrex by an ultraviolet source at a rate such that the reaction mixture remained colorless. The temperature of the reaction mixture was allowed to reach its boiling point under total reflux using a Dry-Ice condenser. The reaction mixture was cooled, washed with water, neutralized with a dilute aqueous sodium hydroxide wash containing also a little sodium sulfite and dried by azeotropic distillation. Gas-liquid chromatographic analysis of the product showed the presence of the starting chloride (about 43%), I (about 23%), and eight other components totaling about 34%. Preparative G.L.C. gave impure I (89%) identified by its NMR spectrum and G.L.C. retention time.

EXAMPLE III

The hepatotoxicity of the novel inhalation anesthetic of the present invention was determined essentially according to the method of Jones et al., 19 Anesthesiology 715–23 (1958). The anesthetic was dissolved in corn oil and administered to white mice by gavage. The MHT 3+ is the minimal dose causing severe microscopic manifestations of hepatotoxicity (fatty change) 24 hours after administration. The $AD_{50}$ is the dose causing anesthesia in 50% of the test mice in 10 minutes; the $LD_{50}$ is the dose causing death in 50% of the test mice in 24 hours. The hepatotoxic margin of safety by the oral route in mice is given by the ratio MHT 3+/$AD_{50}$ and is recorded in Table I, below. For purposes of comparison, similar data which was obtained under the same conditions as for the above compound is given for four inhalation anesthetics in current use, viz., ether, chloroform, halothane and methoxyflurane.

TABLE I.—ORAL HEPATOTOXICITY IN MICE

| Compound | MHT 3+ mm./kg. | $AD_{50}$ mm./kg. | $LD_{50}$ mm./kg. | MHT 3+ $AD_{50}$ |
|---|---|---|---|---|
| $CHF_2-CCl_2-CHF_2$ | >30.6 | 16 | 28 | >1.9 |
| Ether | 58 | 30 | 37 | 1.9 |
| Chloroform | 3.1 | 24 | [1] 23 | 0.13 |
| Halothane | 2.4 | 23 | 62 | 0.10 |
| Methoxyflurane | 2.5 | 7.1 | 23 | 0.35 |

[1] After 48 hours the $LD_{50}$ was only 4.8. Chloroform was the only anesthetic tested which showed significant mortality later than 24 hours after administration.

The results set forth in the above table show a substantial and significant improvement in the hepatotoxic margin of safety by the administration of the novel compound of this invention by the oral route as compared to three of the inhalation anesthetics in current use, and a margin of safety comparable to that shown by ether.

EXAMPLE IV

The soda lime stability of the novel inhalation anesthetic of the present invention was determined essentially according to the method of Glover and Hodgson, 16 Anesthesia 19–23 (1961). The liquid anesthetic (0.65 ml.) and soda lime (0.50 gm., 8–12 mesh, 15–20% by weight of water) were sealed in a glass ampule and heated at 70° C. for three hours and then analyzed by gas-liquid partition chromatography. For purposes of comparison, a liquid anesthetic blank was treated in the same way in the absence of soda lime. The chromatographic results are given in Table II, below, in which "R.T." is retention time in minutes from air and "Area percent" is 100 times the ratio of the area under a peak to the total area under all peaks in the recorded chromatogram. A column ten feet long and ¼ inch in diameter packed with 20% diisodecylphthalate on 80–100 mesh firebrick and a thermoconductivity detector were employed in this study. For purposes of comparison, similar data which was obtained under the same conditions as for the above compound is given for halothane and for 3,3-dichloro-1,1,2,2-tetrafluoropropane, which is a position isomer of the compound of this invention.

TABLE II.—SODA LIME STABILITY OF ANESTHETICS

| Compound | Blank | | Soda lime treated | | | | | |
|---|---|---|---|---|---|---|---|---|
| | R.T. | Area percent | R.T. | Area percent | R.T. | Area percent | R.T. | Area percent |
| $CHF_2-CCl_2-CHF_2$ | 5.2 | 99.7 | 1.5 | 0.10 | 4.6 | 0.08 | 5.2 | 99.5 |
| $CHF_2-CF_2-CHCl_2$ | 7.2 | 99.9+ | | | 5.6 | 53.3 | 7.3 | 46.6 |
| Halothane | 7.2 | 99.9+ | | | 4.2 | 0.20 | 7.2 | 99.8 |

The remarkable soda lime stability of the novel dichlorotetrafluoropropane of this invention is shown by the high correspondence between the 99.7 and 99.5 Area percents after 5.2 minutes of retention time in the blank sample and the soda lime treated sample, respectively.

EXAMPLE V

Inhalation of the vapor of 2,2-dichloro-1,1,3,3-tetrafluoropropane admixed with air according to the procedure described by Robbins, 86 J. Pharmacol. Exper. Therap. 197–204 (1946), produced anesthesia in white mice. The minimum concentration by volume percent needed to produce full anesthesia in 50% of the mice in five minutes, $AC_{50}$, and the minimum concentration by volume percent needed to kill 50% of the mice in five minutes, $LC_{50}$, are given in Table III, below. The inhalation margin of safety as measured in mice by the $LC_{50}/AC_{50}$ ratio is also given for the above compound. For purposes of comparison, similar data which was obtained under the same conditions as for the above compound is given for three inhalation anesthetics in current use, viz., either, chloroform, and halothane. The number of mice used with the different agents varied from 25 to 92 for determining each of the $AC_{50}$ and $LC_{50}$ doses.

TABLE III.—INHALATION ANESTHESIA IN MICE

| Compound | $AC_{50}$ | $LC_{50}$ | $LC_{50}/AC_5$ |
|---|---|---|---|
| $CHF_2-CCl_2-CHF$ | 0.68 | 2.78 | 4.1 |
| Ether | 3.38 | 13.6 | 3.5 |
| Chloroform | 0.95 | 2.63 | 2.8 |
| Halothane | 0.78 | 2.74 | 3.5 |

The results set forth in the above table show that the inhalation margin of safety of the novel dichlorotetrafluoropropane of this invention is better than the margin of safety shown by the three inhalation anesthetics in current use.

EXAMPLE VI

The inhalation anesthetic property of the novel compound of this invention was shown in rabbits. Inhalation of 3–4% concentration by volume of the vapor of 2,2-dichloro-1,1,3,3-tetrafluoropropane admixed with oxygen gave smooth induction to and recovery from full surgical anesthesia in six rabbits tested. The anesthetic compositions used in this example were produced by a conventional anesthetic machine. A closed circle system with a sode lime absorber was employed.

Variations and modifications may be made in the present invention without departing from the spirit or scope thereof, and it is to be understood that all such variations and modifications are included within the scope of the invention as defined in the appended claims.

What is claimed is:
1. 2,2-dichloro-1,1,3,3-tetrafluoropropane.
2. The method of preparing the compound of claim 1 which comprises exothermically reacting a mixture of (A) 1,1,3,3-tetrafluoroacetone and from about one to about two molar equivalents of (B) phosphorous pentachloride by the slow addition of (A) to (B) in the presence of a diluent selected from the group consisting of 1,2-dichlorobenzene and 1,2,4-trichlorobenzene followed by heating to a temperature of from about 80° C. to about 170° C. and then separating 2,2-dichloro-1,1,3,3-tetrafluoropropane from the reaction mixture.

References Cited

UNITED STATES PATENTS 2,917,546  12/1959  Gordon et al.

FOREIGN PATENTS 1,004,606  8/1965  Great Britain.

OTHER REFERENCES

Farah et al., J. Org. Chem. 30, 1241–1242 (April 1965).

DANIEL D. HORWITZ, *Primary Examiner.*

U.S. Cl. X.R.

204—163; 424—350